(12) United States Patent
Park et al.

(10) Patent No.: US 12,195,005 B2
(45) Date of Patent: Jan. 14, 2025

(54) ROAD SLOPE ESTIMATION METHOD FOR A VEHICLE

(71) Applicants: HYUNDAI MOTOR COMPANY, Seoul (KR); KIA CORPORATION, Seoul (KR)

(72) Inventors: Jun Sung Park, Yongin-si (KR); Jae Bin Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 241 days.

(21) Appl. No.: 17/986,069

(22) Filed: Nov. 14, 2022

(65) Prior Publication Data

US 2023/0391343 A1 Dec. 7, 2023

(30) Foreign Application Priority Data

Jun. 7, 2022 (KR) .................. 10-2022-0069073

(51) Int. Cl.
*B60W 40/076* (2012.01)
*B60W 10/18* (2012.01)
*B60W 40/105* (2012.01)

(52) U.S. Cl.
CPC .......... *B60W 40/076* (2013.01); *B60W 10/18* (2013.01); *B60W 40/105* (2013.01); *B60W 2422/70* (2013.01)

(58) Field of Classification Search
CPC .. B60W 40/076; B60W 10/18; B60W 40/105; B60W 2422/70; B60W 2520/105; B60W 2552/30; B60W 10/20; B60W 30/18027; B60W 40/072; B60W 40/107; B60W 40/109; B60W 2520/125; B60W 2520/26; B60W 2520/28; B60W 2540/10; B60W 2540/18; B60W 2552/15; B60Y 2400/3032; B60Y 2400/304
See application file for complete search history.

(56) References Cited

U.S. PATENT DOCUMENTS

2004/0162654 A1* 8/2004 Lu .................. B60G 17/0162
180/282
2008/0140291 A1* 6/2008 Kobayashi .......... B60W 40/107
701/70

(Continued)

FOREIGN PATENT DOCUMENTS

JP 2005194934 A 7/2005
JP 2010112793 A 5/2010

(Continued)

*Primary Examiner* — Sizo B Vilakazi
(74) *Attorney, Agent, or Firm* — Lempia Summerfield Katz LLC

(57) ABSTRACT

Proposed is a road slope estimation method for a vehicle. The method includes: calculating, by a controller, a basic slope based on an output value of an acceleration sensor of the vehicle; calculating, by the controller, an acceleration/deceleration correction value from an acceleration/deceleration correction map; and calculating, by the controller, a turning correction value from a turning correction map. The method further includes: calculating, by the controller, a final slope based on the basic slope, the acceleration/deceleration correction value, and the turning correction value; and controlling the vehicle based on the final slope.

19 Claims, 8 Drawing Sheets

(56) References Cited

U.S. PATENT DOCUMENTS

| | | | | |
|---|---|---|---|---|
| 2010/0017058 | A1* | 1/2010 | Lu | B60W 40/11 |
| | | | | 701/38 |
| 2011/0202305 | A1* | 8/2011 | Willis | G01C 21/188 |
| | | | | 702/141 |
| 2015/0284007 | A1* | 10/2015 | Jeong | G01P 15/16 |
| | | | | 701/51 |
| 2017/0166210 | A1* | 6/2017 | Kim | B60W 30/18027 |
| 2024/0034341 | A1* | 2/2024 | Qu | B60W 40/114 |

FOREIGN PATENT DOCUMENTS

| | | |
|---|---|---|
| KR | 20210036644 A | 4/2021 |
| KR | 20210071140 A | 6/2021 |

* cited by examiner

ROAD SLOPE ESTIMATION METHOD FOR A VEHICLE

CROSS REFERENCE TO RELATED APPLICATION

The present application claims priority to and the benefit of Korean Patent Application No. 10-2022-0069073, filed Jun. 7, 2022, the entire contents of which are incorporated herein by reference.

BACKGROUND

Field

The present disclosure relates to a technology for estimating the slope of a road on which a vehicle is traveling.

Description of the Related Art

A vehicle may realize a more efficient driving state by using the slope information of a road on which the vehicle is driving so as to control an engine and a transmission.

In a vehicle, the slope information is mainly obtained by using the output value of an acceleration sensor mounted to the vehicle.

However, the output value of the acceleration sensor is output as a different value even for a road with the same slope according to the driving situation of a vehicle, and slope information obtained on the basis of this may be different from the actual slope of a road.

For example, the slope information of a road calculated on the basis of the output value of the acceleration sensor is greatly different from the actual slope of a road during turning, acceleration, or deceleration of a vehicle.

As described above, when vehicle devices such as an engine and a transmission are controlled by using the slope information which has a very large difference from the actual slope of a road, the driving condition of the vehicle may become undesirable.

The matters described in this Background are only to improve the understanding of the background of the present disclosure, and should not be taken as acknowledging that they correspond to the prior art already known to those having ordinary skill in the art.

SUMMARY

The present disclosure proposes a road slope estimation method for a vehicle. According to this method, when the slope of a road is estimated by using the output value of an acceleration sensor of a vehicle, it is possible to properly correct the slope according to the driving condition of a vehicle so as to estimate more accurate slope of a road, thereby realizing more efficient driving condition of the vehicle by controlling the vehicle on the basis of this more accurate slope.

According to one aspect of the present disclosure, a road slope estimation method for a vehicle includes: calculating, by a controller, a basic slope based on an output value of an acceleration sensor of the vehicle; and calculating, by the controller, an acceleration/deceleration correction value from an acceleration/deceleration correction map. The method further comprises: calculating, by the controller, a turning correction value from a turning correction map; calculating, by the controller, a final slope based on the basic slope, the acceleration/deceleration correction value, and the turning correction value; and controlling the vehicle based on the final slope.

The acceleration/deceleration correction map may be configured as a two-dimensional map of the acceleration/deceleration correction value according to a vehicle speed change rate and the basic slope.

The vehicle speed change rate of the acceleration/deceleration correction map may be a time-dependent change rate of a vehicle speed calculated by using an output value of a wheel speed sensor of a vehicle.

The acceleration/deceleration correction map may have a tendency that as the vehicle speed change rate increases, the acceleration/deceleration correction value increases, and as the basic slope increases, the acceleration/deceleration correction value increases.

The turning correction map may be configured as a two-dimensional map of the turning correction value according to longitudinal and lateral accelerations of a vehicle.

The turning correction map may have a tendency that as the longitudinal acceleration decreases, the turning correction value increases as a negative value, and as the lateral acceleration increases, the turning correction value increases as a negative value.

At the step of calculating the final slope, the final slope may be calculated by subtracting the acceleration/deceleration correction value and the turning correction value from the basic slope.

The method may further include: calculating, by the controller, a steering correction value from a steering correction map. In particular, the steering correction map may be configured as a two-dimensional map of the steering correction value according to a steering angle and a vehicle speed. In another embodiment, when calculating the final slope, the controller may calculate the final slope further based on the steering correction value.

The steering correction map may have a tendency that as the steering angle increases, the steering correction value increases, and as the vehicle speed increases, the steering correction value decreases.

The method may further include: calculating, by the controller, a starting correction value from a starting correction map. In particular, the starting correction map may be configured as a two-dimensional map of the starting correction value according to a vehicle speed and an acceleration difference. In another embodiment, when calculating the final slope, the controller may calculate the final slope by further considering the starting correction value.

The acceleration difference may be a value obtained by subtracting an acceleration, which is calculated by using an output value of a wheel speed sensor of a vehicle, from the output value of the acceleration sensor. The starting correction map may include a nose-up area in which the acceleration difference is positive and a nose-down area in which the acceleration difference is negative.

The nose-up area of the starting correction map may have a tendency that as the acceleration difference increases and the vehicle speed decreases, the starting correction value increases as a negative value. The nose-down area of the starting correction map may have a tendency that as the acceleration difference increases as a negative value and the vehicle speed decreases, the starting correction value increases.

The method may further include: calculating, by the controller, a braking correction value from a braking correction map. In particular, the braking correction map may be configured as a one-dimensional map of the braking correction value according to braking pressure. In one embodiment, when calculating the final slope, the controller may calculate the final slope by further considering the braking correction value.

The braking correction map may have a tendency that as the braking pressure increases, the braking correction value increases in a negative direction.

The method may further include: calculating, by the controller, the steering correction value from the steering correction map; calculating, by the controller, the starting correction value from the starting correction map; and calculating, by the controller, the braking correction value from the braking correction map. In particular, the steering correction map may be configured as a two-dimensional map of the steering correction value according to the steering angle and the vehicle speed. The starting correction map may be configured as the two-dimensional map of the starting correction value according to the vehicle speed and the acceleration difference. In addition, the braking correction map may be configured as the one-dimensional map of the braking correction value according to braking pressure. In another embodiment, when calculating the final slope, the controller may calculate the final slope by further considering at least one of the steering correction value, the starting correction value, or the braking correction value.

In one embodiment, when calculating the final slope, the final slope may be calculated by subtracting the acceleration/deceleration correction value, the turning correction value, the steering correction value, the starting correction value, and the braking correction value from the basic slope.

The method may further include: determining, by the controller, whether a predetermined holding condition is met before the step of calculating the basic slope. When the predetermined holding condition is met, a previously calculated final slope, which has been calculated just before the predetermined holding condition is met, is maintained as the final slope.

The holding condition may be met in extremely low speed in which a vehicle speed is less than a predetermined holding vehicle speed; in rapid acceleration in which a vehicle speed change rate exceeds a predetermined maximum vehicle speed change rate; in rapid deceleration in which the vehicle speed change rate is less than a predetermined minimum vehicle speed change rate; in a state in which a wheel of a vehicle is locked; in rapid acceleration in which an accelerator pedal position change rate exceeds a predetermined maximum position change rate; in rapid manipulation release in which the accelerator pedal position change rate is less than a predetermined minimum position change rate; in rapid steering in which a steering angle exceeds a predetermined reference steering angle; or in a wheel slip situation in which speed difference between front and rear wheels exceeds predetermined reference wheel speed difference.

While the vehicle is driving, the controller may continuously repeat the step of calculating the final slope from the step of determining whether the holding condition is met.

According to the present disclosure, when estimating the slope of a road by using the output value of an acceleration sensor of a vehicle, it is possible to properly correct the slope according to the driving condition of a vehicle so as to estimate more accurate slope of a road, thereby realizing more efficient driving condition of the vehicle by controlling the vehicle on the basis of this more accurate slope.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
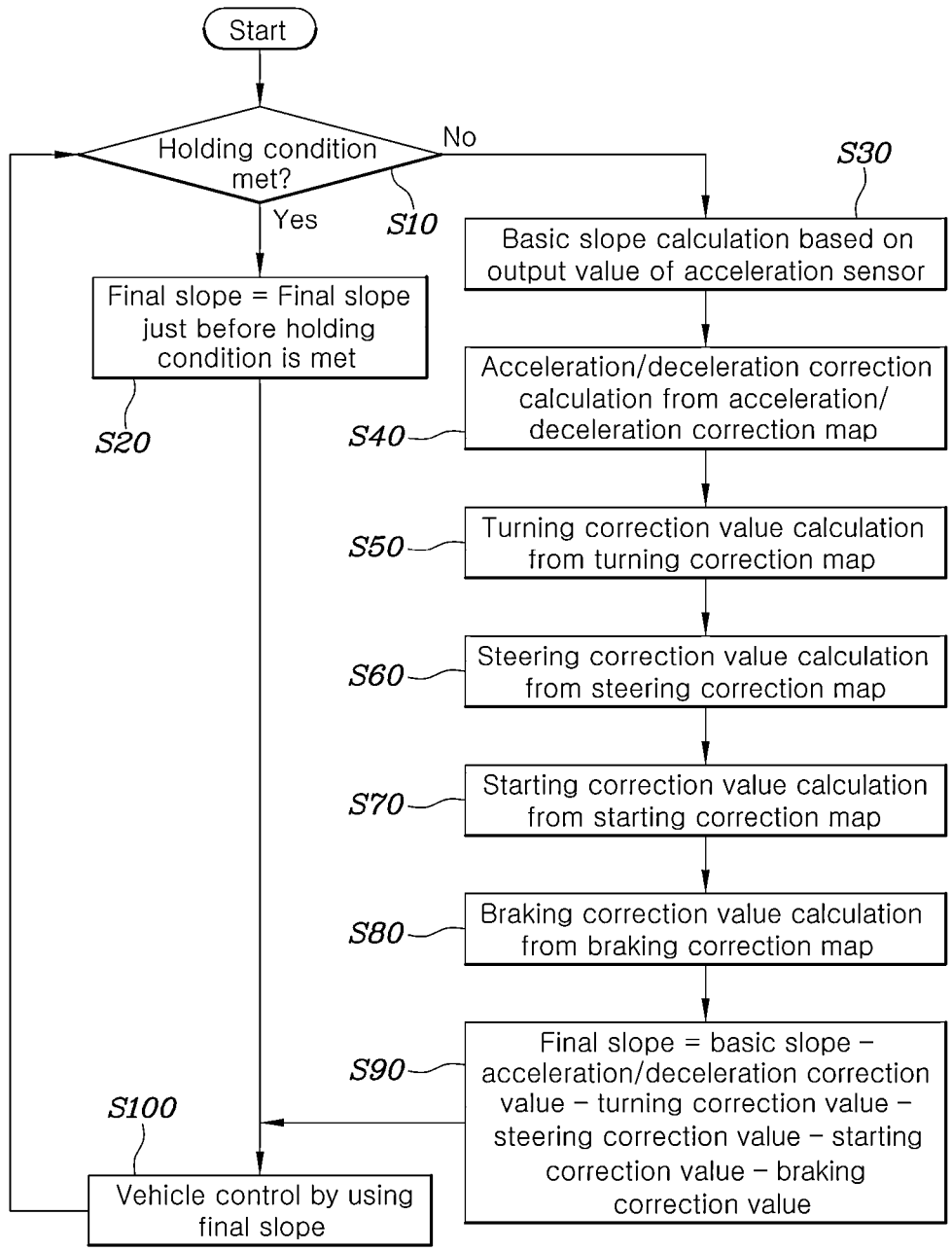
FIG. 1 is a flowchart illustrating a road slope estimation method for a vehicle according to one embodiment of the present disclosure.

Hereinafter, embodiments disclosed in the present disclosure are described in detail with reference to the accompanying drawings, but the same or similar components are assigned the same reference numerals, and redundant description thereof have been omitted.

The terms "module" and "part" for the components used in the following description are given or mixed in consideration of only the ease of writing the specification, and do not have distinct meanings or roles by themselves.

In addition, when it is determined that detailed descriptions of related known technologies may obscure the gist of the embodiment disclosed in this specification in describing the embodiments disclosed in the present specification, the detailed description thereof has been omitted. In addition, the accompanying drawings are only for easily understanding the embodiment disclosed in this specification, and the technical idea disclosed herein is not limited by the accompanying drawings, and the present disclosure should be construed as covering modifications, equivalents, and alternatives falling within ideas and technical scopes of the present disclosure.

Terms including an ordinal number, such as first and second, etc., may be used to describe various components, but the components are not limited by the terms. The above terms are used only for the purpose of distinguishing one component from another.

When a component is referred to as being "coupled" or "connected" to another component, it should be understood that the component may be directly coupled or connected to the another component or intervening components may be present therebetween. In contrast, when a component is referred to as being "directly coupled" or "directly connected" to another component, it should be understood that there is no intervening component present therebetween.

Singular forms include plural forms unless the context clearly indicates otherwise.

In the present specification, it should be understood that terms such as "comprises" or "have" are intended to designate that features, numbers, steps, operations, components, parts, or combinations thereof described in the specification exist, but do not preclude the possibility of the existence or addition of one or more other features, numbers, steps, operations, components, parts, or combinations thereof.

In addition, a unit or a control unit included in the names of a motor control unit (MCU) and a hybrid controller unit (HCU) is only a term widely used in the naming of a controller that controls the specific function of a vehicle, and does not mean a generic function unit.

The controller may include a communication device that communicates with other controllers or sensors to control functions for which the communication device is responsible, memory that stores an operating system, logic commands, and input/output information, etc., and one or more processors that perform judgment, calculation, and determination, etc. necessary to control functions for which the more or more processors are responsible.

FIG. 1 is a flowchart illustrating the embodiment of a road slope estimation method for a vehicle according to one embodiment of the present disclosure. The road slope estimation method may include a step S30 at which the controller calculates a basic slope based on an the output value of an acceleration sensor; a step S40 at which the controller calculates an acceleration/deceleration correction value from an acceleration/deceleration correction map; a step S50 at which the controller calculates a turning correction value from a turning correction map; a step S90 at which the controller calculates a final slope based on the basic slope, the acceleration/deceleration correction value, the turning correction value; and a step S100 at which the final slope is used to control a vehicle.

Similar to the prior art, in the present disclosure, after the slope of a road on which a vehicle is driving is calculated based on the output value of the acceleration sensor, the slope is taken as the basic slope. However, the basic slope is corrected by the acceleration/deceleration correction value and the turning correction value so as to calculate the final slope in the present disclosure, whereby the vehicle may be controlled by using the calculated final slope.

Figure 2:
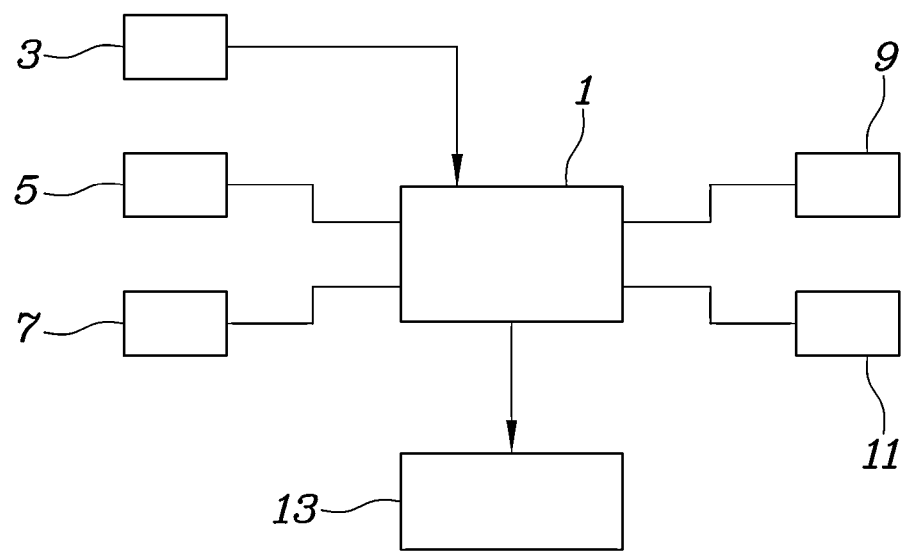
FIG. 2 is a block diagram illustrating hardware of a vehicle to which the present disclosure can be applied.

For reference, FIG. 2 illustrates hardware of a vehicle to which the present disclosure described above can be applied. As illustrated in FIG. 2, the controller 1 receives signals of the acceleration sensor 3, a wheel speed sensor 5, a steering angle sensor 7, a brake pressure sensor 9, and an accelerator pedal position sensor 11 so as to calculate the basic slope and the final slope. The controller 1 provides the final slope to a mounted device 13 of a vehicle such that the final slope can be used for controlling the vehicle.

Here, the mounted device 13 using the final slope may be an engine and a transmission, etc. In another embodiment, the controller 1 may provide the final slope to the vehicle's network such that other devices mounted to the vehicle use the final slope.

The acceleration/deceleration correction map is configured as the two-dimensional map of the acceleration/deceleration correction value according to a vehicle speed change rate and the basic slope.

The vehicle speed change rate of the acceleration/deceleration correction map is the time-dependent change rate of vehicle speed calculated by using the output value of the wheel speed sensor 5 of a vehicle.

Figure 3:
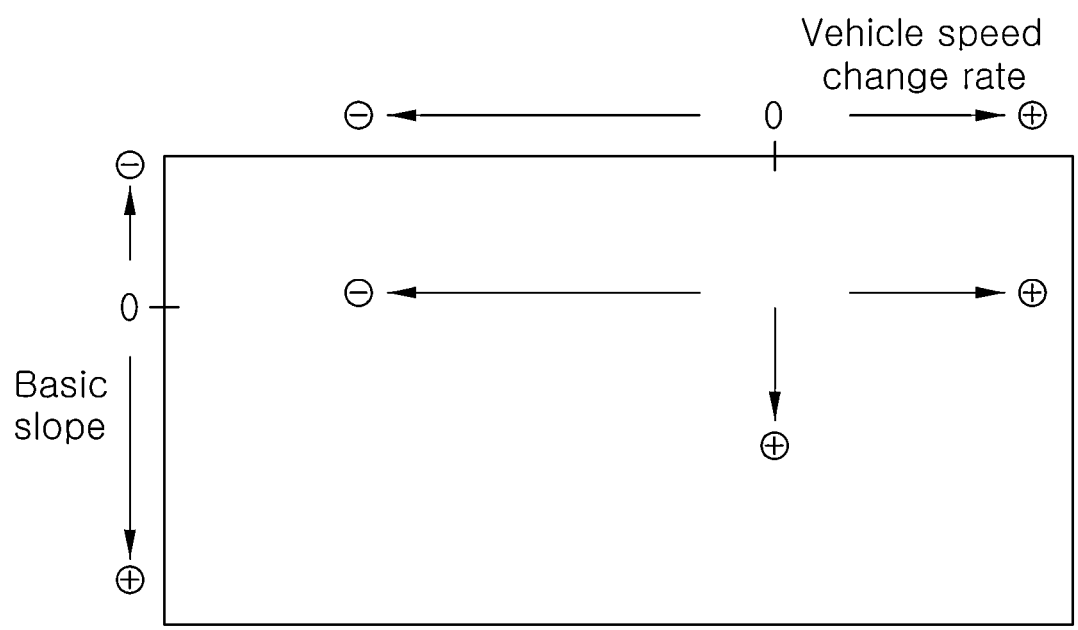
FIG. 3 is a view illustrating an acceleration/deceleration correction map.

As illustrated in FIG. 3, the acceleration/deceleration correction map has a tendency that as the vehicle speed change rate increases, the acceleration/deceleration correction value increases, and as the basic slope increases, the acceleration/deceleration correction value increases.

In other words, the increase of the vehicle speed change rate indicates the increase of the acceleration of a vehicle, and accordingly, the nose of the vehicle is moved more upward by the increase of the acceleration, and thus when the final slope is calculated by subtracting a greater acceleration/deceleration correction value from the basic slope, the final slope has a value closer to the actual slope of a road by offsetting erroneous sensing performed by the acceleration sensor 3 according to the nose-up.

In addition, the nose of a vehicle tends to move more upward on an inclined road with a relatively larger basic slope, and thus as the basic slope increases, the acceleration/deceleration correction value tends to increase.

Furthermore, the increase of the vehicle speed change rate in a negative direction means that the deceleration of a vehicle increases that much, and accordingly, the nose of the vehicle moves down. Accordingly, the acceleration/deceleration correction value is preset to have a larger negative value, and the acceleration/deceleration correction value, which is the negative value, is subtracted from the basic slope, and consequently, the final slope is determined to have a value greater than the basic slope. Accordingly, the final slope receives no effect caused by the nose-down.

For reference, in the drawings of the present disclosure, when an arrow is directed in a "+" direction, an associated value shows the tendency of gradually increasing as a positive value along the direction of the arrow, and when an arrow is directed in a "−" direction, an associated value shows the tendency of gradually increasing as a negative value along the direction of the arrow.

The turning correction map is configured as a two-dimensional map of the turning correction value according to the longitudinal and lateral accelerations of a vehicle.

Figure 4:
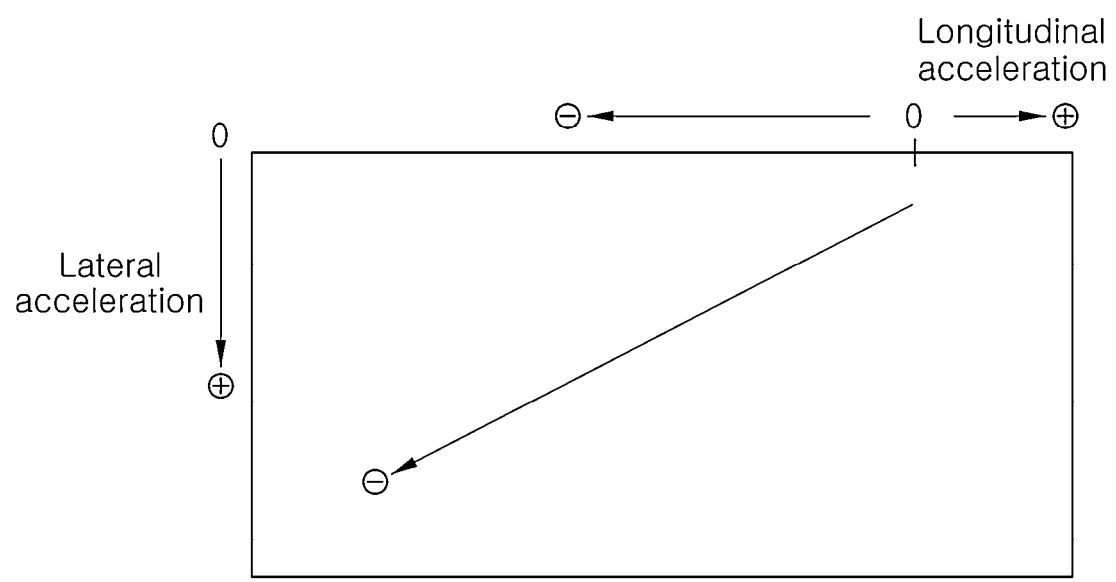
FIG. 4 is a view illustrating a turning correction map.

As illustrated in FIG. 4, the turning correction map has a tendency that as the longitudinal acceleration decreases, the turning correction value increases as a negative value, and as the lateral acceleration increases, the turning correction value increases as a negative value.

In other words, as the sharp turning of a vehicle increases, the longitudinal acceleration increases as a negative value and the lateral acceleration increases in a positive direction, and accordingly, a tendency that the front part of the vehicle is pressed while the vehicle is slanted increases. To offset this, as the longitudinal acceleration increases as the negative value and the lateral acceleration increases as a positive direction, the turning correction value is preset to have a larger value in a negative direction.

At the step of calculating the final slope, the final slope may be calculated by subtracting the acceleration/deceleration correction value and the turning correction value from the basic slope.

Meanwhile, the road slope estimation method of the present disclosure according to the embodiment may further include a step S60 at which the controller 1 calculates a steering correction value from a steering correction map.

The steering correction map is configured as a two-dimensional map of the steering correction value according to a steering angle and the vehicle speed, and at the step S100 of calculating the final slope, the controller 1 may calculate the final slope by further considering the steering correction value.

Figure 5:
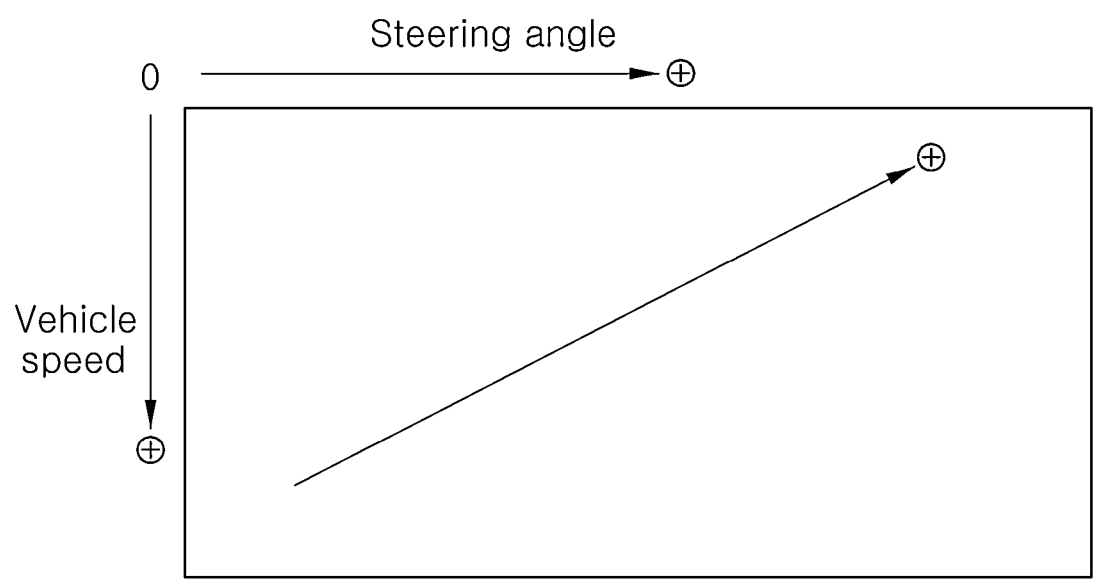
FIG. 5 is a view illustrating a steering correction map.

Here, as illustrated in FIG. 5, the steering correction map has a tendency that as the steering angle increases, the steering correction value increases, and as the vehicle speed decreases, the steering correction value increases.

The steering correction map is intended to supplement a situation not solved by the turning correction map, and for example, is intended to prepare for a situation such as a sudden lane change or noisy steering wheel operation.

Meanwhile, the road slope estimation method of the present disclosure according to the embodiment may further include a step S70 at which the controller 1 calculates a starting correction value from a starting correction map.

The starting correction map is configured as a two-dimensional map of the starting correction value according to a vehicle speed and an acceleration difference, and at the step S100 of calculating the final slope, the controller 1 may calculate the final slope by further considering the starting correction value.

The acceleration difference is a value obtained by subtracting acceleration, which is calculated by using the output value of the wheel speed sensor 5 of a vehicle, from the output value of the acceleration sensor 3, and the starting correction map consists of a nose-up area NU in which the acceleration difference is positive and a nose-down area ND in which the acceleration difference is negative.

Figure 6:
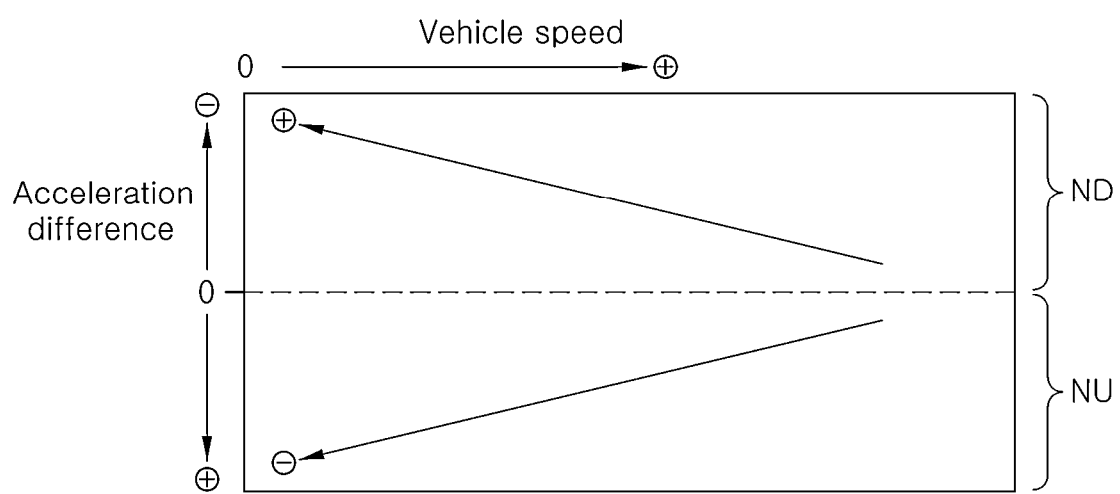
FIG. 6 is a view illustrating a starting correction map.

As illustrated in FIG. 6, the nose-up area NU of the starting correction map has a tendency that as the acceleration difference increases and the vehicle speed decreases, the starting correction value increases as a negative value, and the nose-down area ND of the starting correction map has a tendency that as the acceleration difference increases as a negative value and the vehicle speed decreases, the starting correction value increases.

Figure 7:
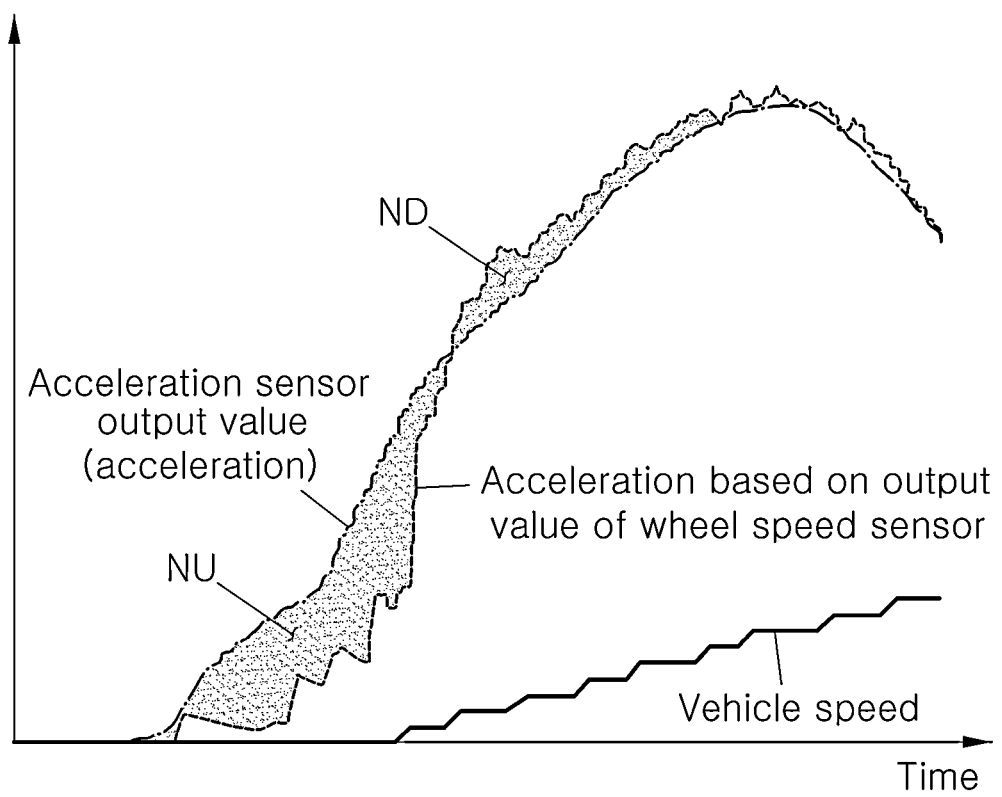
FIG. 7 is a view illustrating time-dependent changes of acceleration calculated by an output value of an acceleration sensor and acceleration calculated by the output value of a wheel speed sensor when a vehicle starts.

The starting correction map is intended to prepare for the starting situation of a vehicle. As illustrated in FIG. 7, when a vehicle starts, acceleration according to the output value of the acceleration sensor 3 is larger than acceleration based on the output value of the wheel speed sensor 5, and as time elapses, the acceleration based on the output value of the wheel speed sensor 5 is larger than the output value of the acceleration sensor 3, and then the values of the accelerations converge to values similar to each other. In consideration of this, the final slope is calculated, so the slope of a road may be estimated more accurately even in the starting situation of a vehicle.

In addition, the road slope estimation method of the present disclosure according to the embodiment may further include a step S80 at which the controller 1 calculates a braking correction value from a braking correction map.

The braking correction map is configured as a one-dimensional map of the braking correction value according to braking pressure, and at the step S100 of calculating the final slope, the controller 1 may calculate the final slope by further considering the braking correction value.

Figure 8:
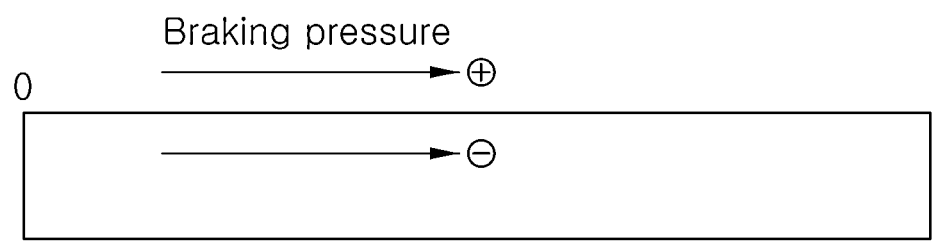
FIG. 8 is a view illustrating a braking correction map.

As illustrated in FIG. 8, the braking correction map has a tendency that as the braking pressure increases, the braking correction value increases in a negative direction.

This considers that as the braking pressure increases, the nose-down of a vehicle increases.

In addition to the steps of calculating the basic slope, the acceleration/deceleration correction value, and the turning correction value, the road slop estimation method of the present disclosure may further include the step S60 at which the controller 1 calculates the steering correction value from the steering correction map; the step S70 at which the controller 1 calculates the starting correction value from the starting correction map; and the step S80 at which the controller 1 calculates the braking correction value from the braking correction map, wherein at the step S100 of calculating the final slope, the controller 1 may calculate the final slope by further considering at least one of the steering correction value, the starting correction value, and the braking correction value.

At the step S100 of calculating the final slope, the final slope may be calculated by subtracting the acceleration/deceleration correction value, the turning correction value, the steering correction value, the starting correction value, and the braking correction value from the basic slope.

Meanwhile, the road slope estimation method may further include a step S10 at which the controller determines whether a predetermined holding condition is met before the step S30 of calculating the basic slope. When the holding condition is met, a previously calculated final slope is maintained as the final slope. The previously calculated final slope is a final slop calculated just before the holding condition is met. (Step S20)

Here, the holding condition is met in an extremely low speed in which a vehicle speed is less than a predetermined holding vehicle speed; in rapid acceleration in which the vehicle speed change rate exceeds a predetermined maximum vehicle speed change rate; in rapid deceleration in which the vehicle speed change rate is less than a predetermined minimum vehicle speed change rate; in a state in which a wheel of the vehicle is locked; in rapid acceleration in which an accelerator pedal position change rate exceeds a predetermined maximum position change rate; in rapid manipulation release in which the accelerator pedal position change rate is less than the predetermined minimum position change rate; in rapid steering in which the steering angle exceeds a predetermined reference steering angle; or in a wheel slip situation in which speed difference between front and rear wheels exceeds predetermined reference wheel speed difference.

Here, for example, the holding vehicle speed may be preset as an extremely low speed of 5 kph or less, and the maximum vehicle speed change rate may be determined by design through multiple experiments and analyses in consideration of the vehicle speed change rate, which is judged to include more errors in the final slope due to excessive rapid acceleration.

Furthermore, the minimum vehicle speed change rate may be determined by design through multiple experiments and analyses in consideration of the vehicle speed change rate, which is judged to include more errors in the final slope due to excessive rapid deceleration.

In addition, the maximum position change rate may be determined by design through multiple experiments and analyses in consideration of the accelerator pedal position change rate, which is judged to include more errors in the final slope due to excessive rapid acceleration.

Additionally, the minimum position change rate may be determined by design through multiple experiments and analyses in consideration of the accelerator pedal position change rate, which is judged to include more errors in the final slope due to the release of an accelerator pedal at a very high speed.

Furthermore, the reference steering angle may be determined by design through multiple experiments and analyses in consideration of the steering angle, which is judged to include more errors in the final slope due to a large degree of manipulation of a steering wheel.

In addition, the reference wheel speed difference may be determined by design through multiple experiments and analyses in consideration of wheel speed difference, which is judged to include more errors in the final slope due to excessive wheel speed difference.

As described above, when the holding condition is satisfied, it is generally advantageous to use a previous final slope rather than to calculate a new final slope during the driving of a vehicle. In this situation, it is more desired to continuously use the final slope just before the holding condition is met.

While a vehicle is driving, the controller 1 may continuously repeat the step S100 of calculating the final slope from the step S10 of determining whether the holding condition is met.

Although the embodiments of the present disclosure have been described for illustrative purposes, those having ordinary skill in the art should appreciate that various modifications, additions and substitutions are possible, without departing from the scope and spirit of the present disclosure.

What is claimed is:

1. A road slope estimation method for a vehicle, the method comprising:
   calculating, by a controller, a basic slope based on an output value of an acceleration sensor of the vehicle;
   calculating, by the controller, an acceleration/deceleration correction value from an acceleration/deceleration correction map;
   calculating, by the controller, a turning correction value from a turning correction map;
   calculating, by the controller, a final slope based on the basic slope, the acceleration/deceleration correction value, and the turning correction value; and
   controlling the vehicle based on the final slope.

2. The method of claim 1, wherein the acceleration/deceleration correction map is configured as a two-dimensional map of the acceleration/deceleration correction value according to a vehicle speed change rate and the basic slope.

3. The method of claim 2, wherein the vehicle speed change rate of the acceleration/deceleration correction map is a time-dependent change rate of a vehicle speed calculated by using an output value of a wheel speed sensor of the vehicle.

4. The method of claim 2, wherein the acceleration/deceleration correction map has a tendency that as the vehicle speed change rate increases, the acceleration/deceleration correction value increases, and as the basic slope increases, the acceleration/deceleration correction value increases.

5. The method of claim 1, wherein the turning correction map is configured as a two-dimensional map of the turning correction value according to longitudinal and lateral accelerations of the vehicle.

6. The method of claim 5, wherein the turning correction map has a tendency that as the longitudinal acceleration decreases, the turning correction value increases as a negative value, and as the lateral acceleration increases, the turning correction value increases as a negative value.

7. The method of claim 1, wherein the final slope is calculated by subtracting the acceleration/deceleration correction value and the turning correction value from the basic slope.

8. The method of claim 1, further comprising:
   calculating, by the controller, a steering correction value from a steering correction map,
   wherein the steering correction map is configured as a two-dimensional map of the steering correction value according to a steering angle and a vehicle speed, and
   wherein the final slope is calculated further based on the steering correction value.

9. The method of claim 8, wherein the steering correction map has a tendency that as the steering angle increases, the steering correction value increases, and as the vehicle speed decreases, the steering correction value increases.

10. The method of claim 1, further comprising:
    calculating, by the controller, a starting correction value from a starting correction map,
    wherein the starting correction map is configured as a two-dimensional map of the starting correction value according to a vehicle speed and an acceleration difference, and
    wherein the final slope is calculated further based on the starting correction value.

11. The method of claim 10, wherein the acceleration difference is a value obtained by subtracting acceleration, which is calculated by using an output value of a wheel speed sensor of the vehicle, from the output value of the acceleration sensor, and
    wherein the starting correction map comprises a nose-up area in which the acceleration difference is positive and a nose-down area in which the acceleration difference is negative.

12. The method of claim 11, wherein:
    the nose-up area of the starting correction map has a tendency that as the acceleration difference increases and the vehicle speed decreases, the starting correction value increases as a negative value, and
    the nose-down area of the starting correction map has a tendency that as the acceleration difference increases as a negative value and the vehicle speed decreases, the starting correction value increases.

13. The method of claim 1, further comprising:
    calculating, by the controller, a braking correction value from a braking correction map,
    wherein:
      the braking correction map is configured as a one-dimensional map of the braking correction value according to a braking pressure, and
      the final slope is calculated further based the braking correction value.

14. The method of claim 13, wherein the braking correction map has a tendency that as the braking pressure increases, the braking correction value increases in a negative direction.

15. The method of claim 1, further comprising:
    calculating, by the controller, a steering correction value from a steering correction map;
    calculating, by the controller, a starting correction value from a starting correction map; and
    calculating, by the controller, a braking correction value from a braking correction map,
    wherein:
      the steering correction map is configured as a two-dimensional map of the steering correction value according to a steering angle and a vehicle speed;
      the starting correction map is configured as a two-dimensional map of the starting correction value according to the vehicle speed and an acceleration difference;
      the braking correction map is configured as a one-dimensional map of the braking correction value according to braking pressure; and
      in calculating the final slope, the final slope is calculated further based on at least one of the steering correction value, the starting correction value, or the braking correction value.

16. The method of claim 15, wherein the final slope is calculated by subtracting the acceleration/deceleration correction value, the turning correction value, the steering correction value, the starting correction value, and the braking correction value from the basic slope.

17. The method of claim 1, further comprising:
determining, by the controller, whether a predetermined holding condition is met before calculating the basic slope,
wherein when the predetermined holding condition is met, a previously calculated final slope, which has been calculated just before the predetermined holding condition is met, is maintained as the final slope.

18. The method of claim 17, wherein the predetermined holding condition is met in an extremely low speed in which a vehicle speed is less than a predetermined holding vehicle speed; in rapid acceleration in which a vehicle speed change rate exceeds a predetermined maximum vehicle speed change rate; in rapid deceleration in which the vehicle speed change rate is less than a predetermined minimum vehicle speed change rate; in a state in which a wheel of the vehicle is locked; in rapid acceleration in which an accelerator pedal position change rate exceeds a predetermined maximum position change rate; in rapid manipulation release in which the accelerator pedal position change rate is less than a predetermined minimum position change rate; in rapid steering in which a steering angle exceeds a predetermined reference steering angle; or in a wheel slip situation in which a speed difference between front and rear wheels exceeds a predetermined reference wheel speed difference.

19. The method of claim 18, wherein while the vehicle is driving, the controller continuously repeats calculating the final slope based on determining whether the predetermined holding condition is met.

* * * * *